United States Patent
Nguyen et al.

(10) Patent No.: US 9,510,042 B2
(45) Date of Patent: Nov. 29, 2016

(54) SET-TOP BOX PROXIMITY DETECTION

(71) Applicant: EchoStar Technologies L.L.C., Englewood, CO (US)

(72) Inventors: Phuc H. Nguyen, Parker, CO (US); Christopher William Bruhn, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/066,778

(22) Filed: Oct. 30, 2013

(65) Prior Publication Data
US 2015/0121428 A1     Apr. 30, 2015

(51) Int. Cl.
| | |
|---|---|
| H04N 21/25 | (2011.01) |
| H04N 21/258 | (2011.01) |
| H04N 21/422 | (2011.01) |
| H04N 21/442 | (2011.01) |
| H04N 21/436 | (2011.01) |
| H04N 21/45 | (2011.01) |
| H04W 4/02 | (2009.01) |
| H04W 64/00 | (2009.01) |
| H04L 29/06 | (2006.01) |
| H04L 29/08 | (2006.01) |
| H04N 5/445 | (2011.01) |

(52) U.S. Cl.
CPC ........ *H04N 21/43615* (2013.01); *H04L 65/00* (2013.01); *H04L 67/18* (2013.01); *H04N 5/445* (2013.01); *H04N 21/44231* (2013.01); *H04N 21/4524* (2013.01); *H04W 4/02* (2013.01); *H04W 64/00* (2013.01)

(58) Field of Classification Search
CPC ............... H04N 21/4182; H04N 21/44218; H04N 21/4532
See application file for complete search history.

(56) References Cited

U.S. PATENT DOCUMENTS

| | | | | |
|---|---|---|---|---|
| 2008/0278535 | A1* | 11/2008 | Yamada | B41J 2/155 347/22 |
| 2008/0278635 | A1* | 11/2008 | Hardacker et al. | 348/734 |
| 2010/0289644 | A1* | 11/2010 | Slavin | G08B 13/2402 340/568.1 |
| 2012/0023540 | A1* | 1/2012 | Meuninck | H04N 13/0282 725/118 |
| 2013/0265267 | A1* | 10/2013 | Victor | G06F 3/0485 345/173 |
| 2014/0012499 | A1* | 1/2014 | Hirose | G01C 21/28 701/470 |

\* cited by examiner

*Primary Examiner* — Brian T Pendleton
*Assistant Examiner* — Jean D Saint Cyr
(74) *Attorney, Agent, or Firm* — Bejin Bieneman PLC

(57) ABSTRACT

A first location of a user in a customer premises may be determined. A display is provided of a user interface that includes an adjustable element. A determination is made that the user has moved to a second location in the customer premises. The display of the user interface is adjusted such that the adjustable element is adjusted.

17 Claims, 4 Drawing Sheets

SET-TOP BOX PROXIMITY DETECTION

BACKGROUND

Media devices such as set-top boxes are used in customer premises to receive media content, e.g., television programming, movies, sporting events, etc. Further, a set-top box or the like may include a graphical user interface (GUI) or the like that provides an interactive program guide (IPG). The IPG generally includes elements such as icons and/or written descriptions representing and/or describing available programming, channels, etc. A display such as a television connected to a set-top box may be used to present a GUI, including an IPG. A display may provide for other features, such as displaying multiple items of media content at one time, e.g., using a so-called picture-in-picture feature, and/or may allow for re-sizing, moving, etc., a window displaying an item of media content, or windows displaying respective items of media content. Likewise, volume of audio provided by a display device is generally adjustable. However, at present, adjustments to such items provided via a set-top box display must be performed manually; present set-top box mechanisms are lacking with respect to taking into account a location of a user and/or user device to automatically perform such adjustments.

DETAILED DESCRIPTION

Overview

Figure 1:
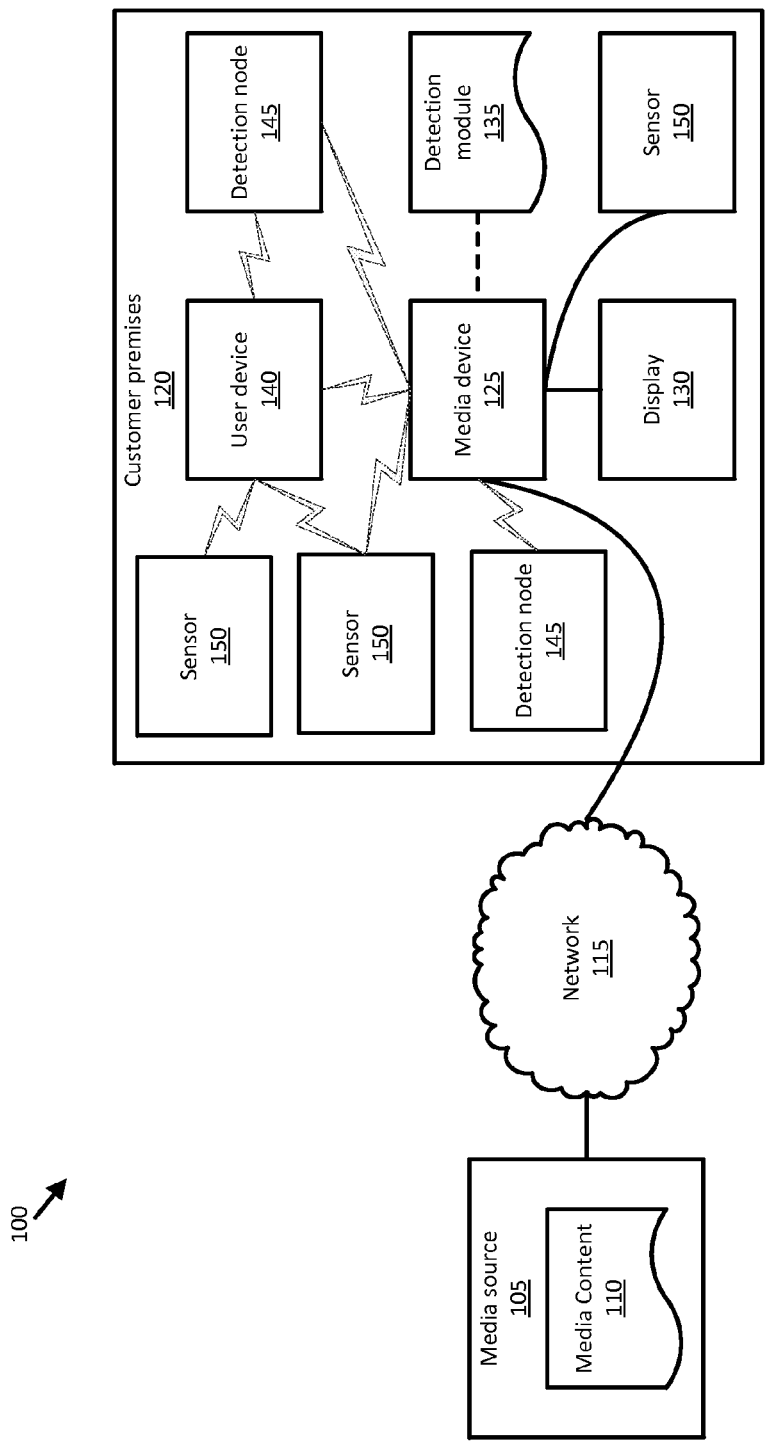
FIG. 1 is a block diagram of an exemplary media content delivery system.

FIG. 1 is a block diagram of an exemplary media content delivery system 100. Using certain elements of the system 100 as disclosed herein, in an exemplary implementation, a media source 105 may provide media content 110, e.g., frames of video and associated audio, to a digital media processing device 125, e.g., a set-top box, in a customer premises 120. The media content 110 may be displayed on a display device 130, e.g., a television set, a digital monitor, etc., included in or communicatively coupled to the media device 125.

The media device 125 may further include a detection module 135, e.g., instructions stored in a memory of the device 125 and executable by a processor thereof. The detection module 135 is generally configured to obtain data from one or more of a user device 140, a detection node 145 that detects or at least provides an approximation or estimate of a device 140 location, and/or a sensor 150 that detects or at least provides an approximation or estimate of a user location. The detection module 135 is further configured, based at least in part on the obtained data, to determine a location of a user and/or a user device 125, i.e., to identify, estimate, approximate, etc., a location including using mechanisms discussed herein. The module 135 is generally yet further configured to implement and/or adjust settings in the media device 125 according to a determined user and/or device 140 location. For example, a size of icons, text, picture displays, audio volume, etc., could be adjusted according to a determined location. Thus, as a user moves about the customer premises 120, visual and/or audio display 130 can be adjusted in a manner appropriate with a user location in the customer premises 120.

Figure 2:
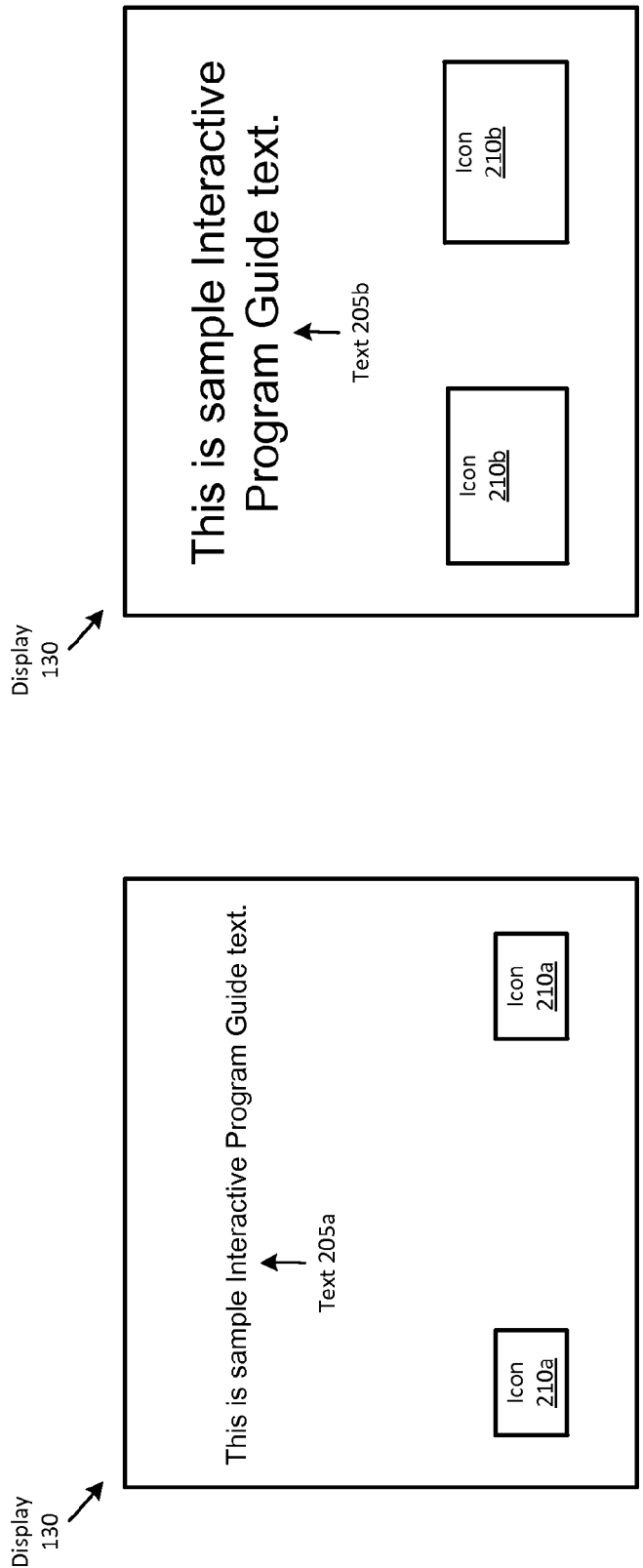
FIGS. 2A and 2B are block diagrams of an exemplary Interactive Program Guide user interface according to first and second determinations of a user, and/or user device, location in a customer premises.
Figure 3:
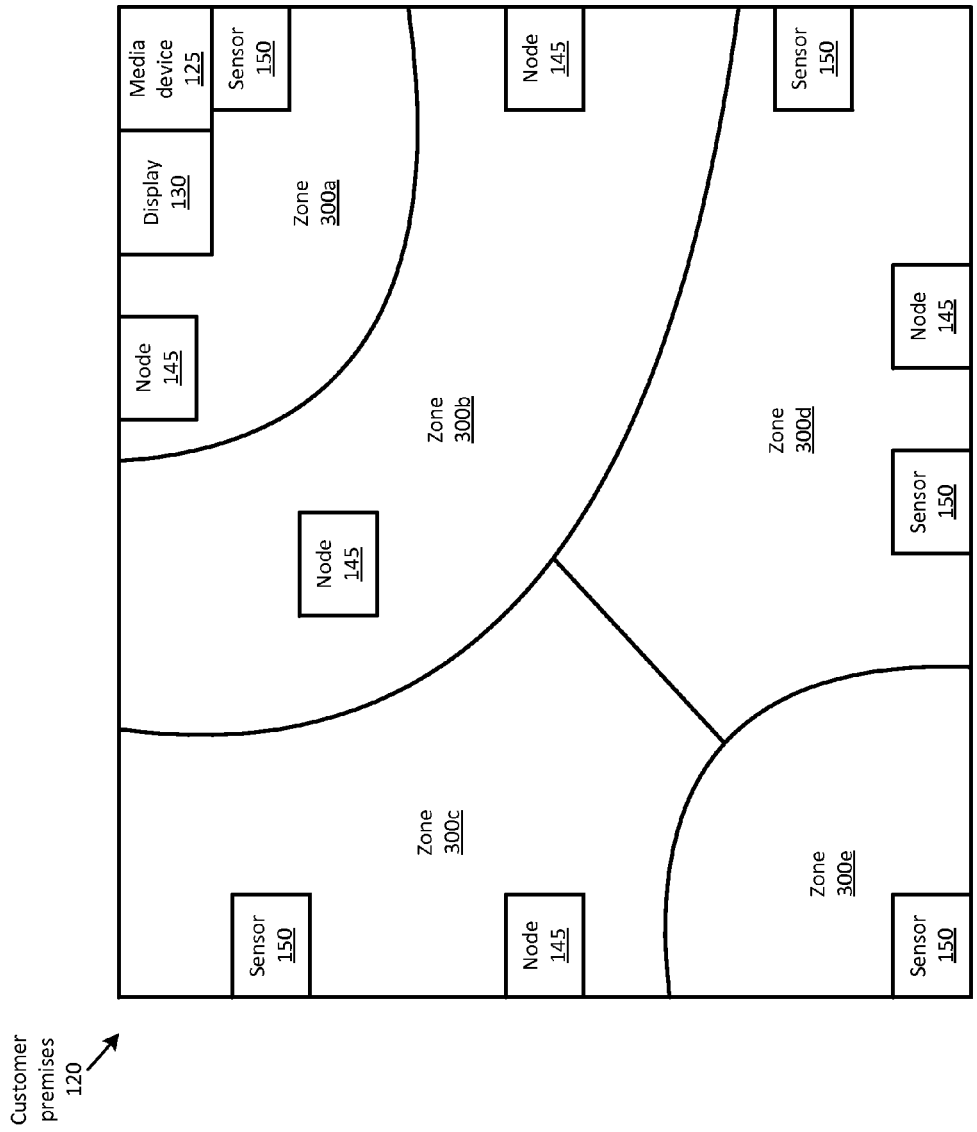
FIG. 3 is a block diagram of an exemplary customer premises divided into various zones.

For example, FIGS. 2A and 2B are block diagrams of an exemplary Interactive Program Guide (IPG) user interface according to first and second determinations of user and/or device 140 locations in a customer premises 120. As seen in FIG. 3, which is a block diagram of an exemplary customer premises 120 divided into various zones 300, a user and/or device 140 could be at a location in any one of a plurality of zones 300 at a given time. Zones 300 may be configured such that identifying a user and/or device 140 location in a particular zone 300 provides an indication of a user's relative proximity to a display 130, e.g., whether the user is relatively near to, at a medium distance from, at a relatively long distance from, etc., the display 130. The detection module 135 may accordingly show a presentation in the display 130 according to a particular zone 300 in the customer premises 120 in which a user and/or device 140 has been determined to be located. For example, as discussed further below, a size, aspect ratio, etc., of a video display may be adjusted, audio volume may be adjusted, etc., based on a user's detected location and the detected location's proximity to the display 130.

Each of the FIGS. 2A and 2B illustrates an exemplary rendering of adjustable elements, i.e., elements that may be displayed differently depending on a location or locations of one or more users and/or devices 140, of an Interactive Program Guide (IPG) rendered in a display 130. For example, a graphical user interface (GUI) including elements of an IPG may include one or more textual elements 205 and one or more icon elements 210. These and other elements rendered in the display 130 may be adjustable in various ways, examples of which are provided herein.

For example, as seen in FIG. 2A, when a user and/or device 140 are at a first location in a customer premises 120, text 205*a* and icons 210*a* may be rendered in a first size, e.g., the first size having been determined to be appropriate for a user's proximity to the display 130 when in a zone 300 including the first location. Continuing this example, with reference to FIG. 3, a user in the zone 300*a* could be presented with a rendering as shown in FIG. 2A. As seen in FIG. 2B, when a user and/or device 140 are at a second location in a customer premises 120, text 205*b* and icons 210*b* may be rendered in a second size, e.g., the second size having been determined to be appropriate for a user's proximity to the display 130 when in a zone 300 including the second location. Yet further for example, again with reference to FIG. 3, a user in the zone 300*b* could be presented with a rendering as shown in FIG. 2B. In the present example, the second location is further from the media device 125 and display 130 than the first location. Accordingly, because the user is less proximate to the display 130 in the second location than in the first location, text 205*a* and icons 210*a* shown in FIG. 2A are rendered in a smaller size than the text 2105*b* and icons 210*b* shown in FIG. 2B.

An IPG may include other adjustable elements in addition, or as an alternative, to those illustrated in FIGS. 2A and 2B, such as one or more windows showing a video presentation, a picture-in-picture display, still images, etc. Moreover, elements of an IPG are illustrated by way of example and not limitation; other elements could additionally or alternatively be rendered in a display 130, and mechanisms described herein could be applied to such other elements. For example, the display 130 could include one or more windows showing respective video presentations, and may provide audio in addition to or in lieu of displaying one or more elements. Upon determining a change of a user and/or device 140 location and/or proximity to the display 130, as mentioned above, sizes and/or locations of such elements could be modified, audio volumes could be changed, etc.

Exemplary System Elements

Media Source

In general, a media source 105 may include multiple elements for processing, storing, and providing media content 110 and related data. Elements of the media source 105 may be local to one another and/or may be distributed amongst multiple locations. For example, media source 105 may include one or more computer servers (some or all of which may be referred to as "media servers") and data storage devices, e.g., for storing and processing content 110 and other data such as discussed herein. A single media source 105 is shown in FIG. 1 for ease of illustration, but the system 100 could include two or more media sources 105.

A media source 105 may be any one or some combination of various mechanisms for delivering media content 110, e.g., one or more computing devices and storage devices, and may depend on a type of media content 110 being provided. By way of example and not limitation, media content 110 data may be provided as video-on-demand through a cable, satellite, or internet protocol television (IPTV) distribution system, as streaming Internet video data, or as some other kind of data. Accordingly, the media source 105 may include one or more of a cable or satellite television head-end, a video streaming service that generally includes a multimedia web server (or some other computing device), or some other mechanism for delivering multimedia data. In general, examples of media content 110 include various types of data, including audio, video, images, etc.

Media content 110 is generally delivered via the network 115 in a digital format, e.g., as compressed audio and/or video data in an MPEG format or the like. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content 110 may be provided in a format such as the MPEG-1, MPEG-2 or the H.264/MPEG-4 Advanced Video Coding standards (AVC) (H.264 and MPEG-4 at present being consistent), or according to some other standard or standards. For example, media content 110 could be audio data formatted according to standards such as MPEG-2 Audio Layer III (MP3), Advanced Audio Coding (AAC), etc. Further, as is known, the foregoing standards generally provide for including metadata in media content 110.

Media content 110 includes media content as it is usually provided for general distribution, e.g., a sports, news, or entertainment program, etc., in a form as provided by a distributor of the media content 110 via a media source 105. Alternatively or additionally, media content 110 may be modified from the form provided by a general distributor of content (e.g., recompressed, re-encoded, etc.). In any case, media content 110 generally includes data by which a display, playback, representation, etc. of an item of media content 110 is presented by a media device 125, e.g., on a display device 130 such a monitor, television set, etc. For example, media content 110, as explained above, generally includes units of encoded and/or compressed video data, e.g., frames of an MPEG file or stream.

Network

Communications to and from the media source 105, customer premises 120, and potentially other sites, may occur via the network 115. In general, the network 115 represents one or more mechanisms for delivering content 110 from the media source 105 to a media device 125. Accordingly, the network 115 may be one or more of various wired or wireless communication mechanisms, including any desired combination of wired (e.g., cable and fiber networks) and/or wireless (e.g., cellular network, satellite network, etc.) communication mechanisms, and any desired network topology (or topologies when multiple communication mechanisms are utilized). Exemplary communication networks include wireless communication networks, local area networks (LAN) and/or wide area networks (WAN), including the Internet, etc.

Customer Premises

Turning to the customer premises 120, as illustrated in FIG. 3, various zones 300 in a customer premises 120 may be defined. According to a determined user and/or device 140 location in one of the zones 300, the detection module 135 may implement one or more rules for rendering media content 110, an IPG, etc., in the display 130, e.g., such rules are generally based on a proximity to the display 130 that may be inferred from a location in a given zone 300. As further seen in FIG. 3, one or more detection nodes 145 and/or one or more sensors 150, each of which are discussed further below, may be located in a zone 300 for use in determining a user and/or device 140 location.

The media device 125 is generally a device including a computer processor and associated storage, e.g., volatile memory, nonvolatile memory, etc., and capable of communicating via the network 115. Exemplary media devices 125 include a set-top box that includes or is coupled to a digital video recorder (DVR), a personal computer such as a laptop, handheld, or tablet computer, etc.

The media device 125 may include a display 130 and/or may be connected to a display device 130, e.g., a television, or may incorporate a display device, e.g., a display of a tablet or personal computer. When content 110 is referred to herein as being "displayed," it is to be understood that such display could include any possible mode of displaying media data, such as a display of visual data, audio data, etc. For example, content 110 could be displayed by showing video or image data on a screen with or without sound, by playing audio data with or without a visual display, etc.

As illustrated in FIG. 3, the media device 125 may include and/or be communicatively coupled with a sensor 150 providing input to the media device 125 concerning a user location in a zone 300a that includes the media device 125. For example, a sensor 150 may include infrared, optical, and/or other mechanisms for capturing data that may be interpreted by the detection module 135 to determine a user location that may be in a zone 300a that also includes the media device 125. Further, the media device 125 generally communicates with detection nodes 145 and/or sensors 150 via known mechanisms, e.g., according to IEEE 802.11, the ZigBee protocol, Bluetooth protocol, a wired local area network (LAN), etc.

As mentioned above, the media device 125 generally includes a detection module 135, e.g., a set of instructions stored on a memory of the device 125, and executable by a processor thereof. The detection module 135 is generally configured to detect, determine, and/or estimate a location in the customer premises 120 of a user and/or user device 140, thereby providing an indication of a user proximity to the display 130. As described further below, the detection module 135 may detect a location using data provided by one or more detection nodes 145 and/or sensors 150. The detection module 135 is further generally configured, upon detecting a user and/or device 140 location, to adjust a display provided through the display device 130, e.g., to adjust a size of icons, text, a video picture frame, a size of a picture-in-picture display (or to swap frames in a picture-in-picture display) etc., according to the detected location.

The user device 140 is generally a portable computing device such as a user may carry about the customer premises 120. For example, the device 140 may be a smart phone, smart watch, smart glasses, or tablet computer. The device 140 generally includes a processor and a memory, and may be capable of communicating with the media device 125 and/or one or more detection nodes 145 via a variety of known wireless mechanisms, examples of which include, without limitation, the Bluetooth standard, maintained by the Bluetooth Special Interest Group, Inc., a wireless local area network (WLAN), sometimes popularly referred to as "Wi-Fi," provided according to the IEEE 802.11 standard, the ZigBee protocol, based, as is known, on the IEEE 802.15.4 standard. As discussed further below, the detection module 135 in the media device 125 may use data obtained via such wireless mechanisms to determine a location of the device 140 in the customer premises 120.

Further, the user device 140, as is known, may include software and hardware for using the global positioning system (GPS) to provide geo-coordinates of the user device 140. Although GPS data may be unobtainable in certain locations of a customer premises 120, e.g., in certain indoor locations, where GPS data for device 140 is available, GPS data may be provided to the media device 125 for an indication of the device 140 location, and whether to adjust a display provided through the display device 130.

The customer premises 120 may include one or more detection nodes 145, as mentioned above. Examples of detection nodes 145 include, without limitation, known devices such as a ZigBee proximity sensor and/or other devices included on a ZigBee network, a wireless router operating according to IEEE 802.11 a device using Bluetooth, etc. For example, a wireless router detection node 145 could use a signal strength of a user device 140 to determine a proximity of the user device 140 to the wireless router node 145. Further for example, it is a known use of ZigBee to detect a relevant distance of devices on a ZigBee network from one another. Yet further additionally or alternatively, a node 145 could include a second media device 125 in a customer premises 120 and/or components of systems unrelated to delivering media content 110, e.g., a security system, a home appliance, etc.

Further for example, one or more Bluetooth devices, which could be any computing device, appliance, etc. in the customer premises 120 using Bluetooth, could be used as detection nodes 145 to determine a presence or absence of the device 140 within a certain distance of the node 145, within a certain area around the node 145, etc. That is, Bluetooth may be used to determine device proximity in a known manner, and moreover, even in situations where Bluetooth may not be conducive to determining a signal strength, because Bluetooth operates over a relatively short range as is known, the presence or absence of a Bluetooth signal from a particular node 145, particularly if in conjunction with information from other Bluetooth nodes 145, may be used to determine a location of the user device 140 in the customer premises 120.

One or more sensors 150 in the customer premises 120 may be used to detect presence of a user at various locations, e.g., in various zones 300, of the premises 120. For example, a sensor 150 could include a mechanism for indicating a user presence and/or location, e.g., using infrared, optical imaging, magnetic, vibration detection, etc., techniques. A sensor 150 could include, e.g., a camera that could be used to determine that a user is present in a zone 300 of customer premises 120. Further, imaging techniques could be used to determine a user identity. Sensors 150 could be dedicated for use in the system 100, but could be in the customer premises 120 as part of other systems and/or devices unrelated to the system 100, e.g., a "WebCam" or the like used for security purposes, a motion detector associated with a videogame such as the Microsoft Corporation's Xbox Kinect, etc.

Multiple detection nodes 145 and/or sensors 150 may be used together to provide information to the detection module 135 for determining a location of a user device 140, e.g., using various triangulation techniques. For example, different types of detection nodes 145, e.g., a Wi-Fi node 145 and a Bluetooth node 145, could be used together by the detection module 135. In this example, a Bluetooth node 145 could indicate whether a user device 140 was detected, e.g., whether the device 140 was in a zone 300 including the Bluetooth node 145. Further, a Wi-Fi node 145 could measure a signal strength of the user device 140. The measured signal strength from the Wi-Fi node 145 could be combined with data from the Bluetooth node 145 indicating whether the device 140 was identified to predict a location of the device 140, e.g., a zone 300 in which the device 140 is located.

In another example, a motion detector sensor 150 could be used to determine that a user was in a particular room of a customer premises 120 that included a particular zone 300. A Bluetooth node 145 in the same room could be used to determine whether a user device 140 associated with a user of interest was present in the room. If not, the detection module 135 could disregard motion detected from the sensor 150 because such motion is not likely to be associated with a user of interest.

Moreover, data from different nodes 145 and/or sensors 150 could be combined to pinpoint a specific location of a user and/or device 140 in a zone 300. For example, as mentioned above, various triangulation techniques may be used to combine data from a first node 145 or sensor 150 with data from a second node 145 or sensor 150 to provide a more precise determination of a device 140 location than possible from a single node 145 or sensor 150.

Exemplary Process Flows

Figure 4:
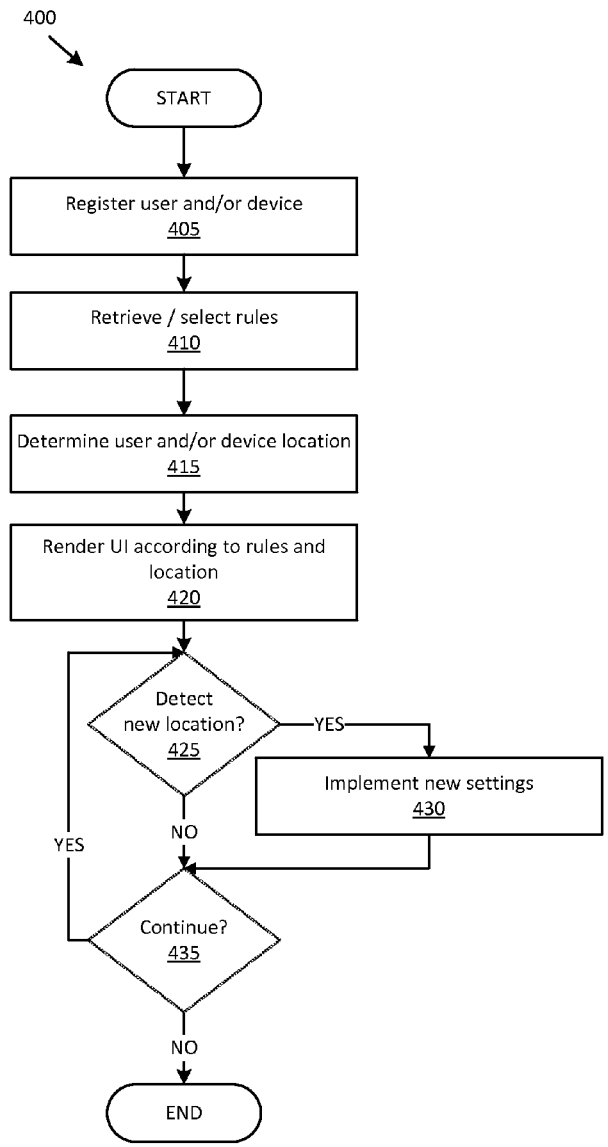
FIG. 4 is a diagram of an exemplary process for implementing and/or adjusting settings in a media device according to a device and/or user location.

FIG. 4 is a diagram of an exemplary process for implementing and/or adjusting settings in a media device according to a device and/or user location The process 400 begins in a block 405, in which the detection module 135 registers a user and/or a device 140. For example, the detection module 135 could begin a registration process when a media device 125 is powered up. In this context, "registration" means that the module 135 obtains or generates a unique or substantially unique identifier for a user and/or device 140. In this scenario, a user and/or device 140 detected by a node 145 and/or sensor 150 in communication with the device 125 could be registered by the module 135. An identifier for a device 140 could be communicated to the media device 125. Alternatively or additionally, the module 135 in the media device 125 could use image recognition techniques or the like to identify a user image provided by a camera sensor 150.

Next, in a block 410, the detection module 135 retrieves and/or configures rules for rendering an interface in the display 130 according to a detected user and/or device 140 location. For example, as discussed elsewhere herein, various zones 300 may be defined in a customer premises 120. Further, rules concerning one or more respective users and/or devices 140 may be associated with zones 300 and/or specific locations in a customer premises 120. For example, a rule may specify that when a device 140 is in a first zone 300, icons in a GUI of the display 130 should be of a first size, but that when the device 140 is in a second zone 300, icons in the GUI should be of a second, e.g., larger, size. Many other rules are possible, including examples provided elsewhere herein.

Next, in a block 415, the detection module 135 determines a user and/or device 140 location, e.g., for each of one or more users and/or devices 140 that may have been registered as described above with respect to the block 405. As discussed above, various combinations of one or more detection nodes 145 and/or sensors 150 could be used to determine a user and/or device 140 location. In addition, as also mentioned, other mechanisms could be used, e.g., GPS functionality in a device 140.

Next, in a block 420, the module 135 causes a user interface to be rendered in the display 130 according to rules retrieved or selected as described above with respect to the block 410, and a location determined as described above with respect to the block 415. For example, such rules could determine a size of icons 210, text 205, a video frame, etc. in the display 130, and/or could determine a volume of audio provided by the display 130. FIGS. 2A and 2B show one example of how icons 210 and text 205 could be re-sized, e.g., scaling a size of a video display. etc., when a location change of a user and/or device 140 is detected. However, many other examples are possible, e.g., re-sizing could include changing an aspect ratio of a video display.

Further, in addition to changing a shape, appearance, size, etc. of an element such as an icon 210, etc., the module 135 could include instructions to include or not include one or more elements in a UI in the display 130 depending on a detected location of a user and/or device 140. For example, when a user is close to the display 130, a rule could specify to display a certain set of icons 210. However, when a user is in a zone 300 further from the display 130 than the closest zone 300, a rule could specify to display a subset, i.e., less than all, of the icons 210 displayed when the user is in the closest zone 300. Such a rule could be appropriate where each icon 210 displayed when the user was in a farther zone 300 was rendered in a larger size, and therefore consumed a larger portion of the display 130, then when icons 210 were displayed for the user in a closer zone 300.

Yet further, rules for rendering a user interface could take into account a priority of one user and/or device 140 over another user and/or device 140. For example, a plurality of smart phone devices 140 could be registered with the media device 125. A rule determined as described above could specify an order of precedence of respective smart phone devices 140, such that if a first smartphone device 140 was detected, a location associated with the first smartphone device 140 would govern all UI settings implemented in the display 130. However, if the first smartphone device 140 was not detected, then a location associated with a second smart phone device 140 could govern UI settings, etc. Likewise, rules could specify that a location of a first smartphone device 140 may be used to determine UI settings when the first smartphone device 140 is in one or more specified zones 300 of the customer premises 120, but when the first smart phone device leaves the specified zone or zones 300, then a location of one or more second smart phone devices may be used.

In any event, a block 425 is executed following the block 420. In the block 425, the detection module 135 determines whether a new location of at least one user and/or device 140 has been detected. For example, GPS functionality associated with a device 140 could be used to indicate a new location of the device 140, e.g., movement of the device 140 to geo-coordinates having a specified difference from prior geo-coordinates. Further for example, detection nodes 145 and/or sensors 150 could be used as described elsewhere herein to determine a new location of the device 140. Moreover, as mentioned above, the module 135 could determine location changes of more than one user and/or device 140. For example, the module 135 could determine that a first user device 140 is no longer detected within a customer premises 120, and that a second user device 140 has changed location within the customer premises 120. In any event, if a new location is detected in the block 425, then a block 430 is executed next. Otherwise, a block 435 is executed next.

In the block 430, similar to the block 420 described above, the detection module 135 implements UI settings according to a location or locations of the one or more users and/or devices 140 detected as described with respect to the block 425. For example, if a user and/or device 140 location has changed, then the module 135 may change UI settings, e.g., a user has moved from a first zone 300a to a second zone 300b in the customer premises 120, whereby the module 135 is configured to decrease a volume of audio in media content 110, as well as to decrease a size of icons 210 and text 205 rendered in the UI on the display 130. Likewise, if a first user device 140 is no longer detected within the customer premises 120, then the module 135 may implement UI settings according to a location of a second user device 140.

Following either the block 430 or the block 425, the module 135 determines whether the process 400 should continue. For example, a user could provide input to end the process. Alternatively or additionally, the process 400 could end when the media device 125 is powered off, after a predetermined period of time lapses when no location changes of users and/or devices 140 are detected, etc. In any case, if the process 400 is to continue, then control returns to the block 425. Otherwise, the process 400 ends.

Figure 5:
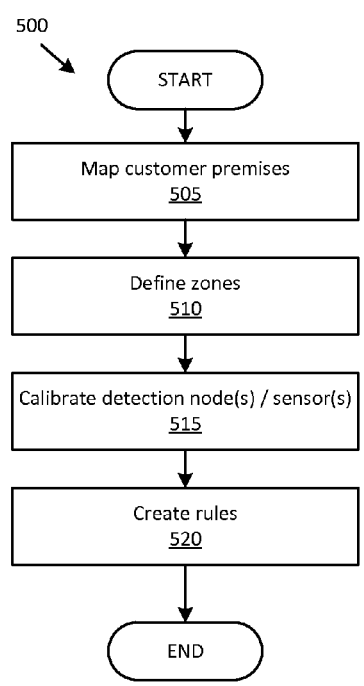
FIG. 5 is a diagram of an exemplary process for establishing location zones and setting rules pertaining to a media device.

FIG. 5 is a diagram of an exemplary process 500 for establishing location zones 300 in a customer premises 120 and setting rules pertaining to a media device 125.

The process 500 begins in a block 505, in which a map of a customer premises 120 is stored in the media device 125. For example, boundaries of the customer premises 120 could be defined according to geo-coordinates, or some other coordinate system. Further, boundaries of specific rooms or areas in the customer premises 120 could likewise be identified. For example, a three-dimensional coordinate system could be defined for a customer premises 120, e.g., situating the media device 125 at an origin, and specifying a location of elements in the customer premises 120, e.g., boundaries, floors, devices 145, 150, etc. with reference to the origin of the coordinate system. A user interface of the media device 125 could allow for specifying an origin of a coordinate system and/or geo-coordinates for a customer premises 120, as well as units for the coordinate system. Such user interface could also allow for specifying locations of boundaries, devices 145, 150, and other elements in the customer premises 120 according to the coordinate system.

Next, in a block 510, zones 300 are defined in a customer premises 120 using the map created in the block 505, e.g., with reference to a coordinate system such as a geo-coordinate system and/or some other coordinate system. Zones 300 may be defined in various ways, e.g., according to rooms, floors, areas, etc. of the customer premises 120. Further, zones 300 could be defined according to a location or locations of detection nodes 145 and/or sensors 150 in the customer premises 120. Zones 300 could be specified according to a user interface provided by the media device 125, e.g., by input directly to the media device 125 and/or via a device 140.

Next, in a block 515, the module 135 performs a calibration of detection nodes 145 and/or sensors 150. This calibration may be performed in conjunction with one or more users and/or devices 140. For example, a user could carry a device 140 to various specified coordinates in the customer premises 120, and measurements from one or more devices 145, 150 could be taken. For example, a signal strength could be measured, a user image could be detected, etc. The calibration of block 515 may not be necessary or carried out in all implementations of the system 100, but can be useful to increase accuracy of location determinations.

Next, in a block 520, rules governing providing a user interface, e.g., including elements of an IPG, a display of media content 110, etc., are created. For example, a GUI could provide a mechanism for a user of a device 140 to input rules to media device 125, or the media device 125 could provide a mechanism for such input. In general, display 130 settings rules specify how various elements are to be rendered in a user interface on the display 130 based on a location of one or more users and/or devices 140. As mentioned above, a rule could specify an order of precedence of users and/or devices 140, as well as specific ways in which elements should be rendered in a UI based on an indicated location of one or more users and/or devices 140.

Following the block 520, the process 500 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical, flash, or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system, comprising:
  a plurality of data gathering computing devices programmed to provide data relating to a location of a portable user device in a customer premises, wherein the plurality of data gathering devices includes at least one of a sensor device and a wireless node; and
  a display-providing computing device that includes a processor and a memory, the display-providing computing device programmed to:
    receive data relating to a location of the portable user device in the customer premises from more than one of the data gathering computing devices;
    based on the data received from more than one of the data gathering computing devices, determine a first location of the portable user device in the customer premises;
    provide a stationary display of a user interface that includes an adjustable element;

receive additional data relating to a location of the portable user device in the customer premises from more than one of the data gathering computing devices;

based on the additional data received from more than one of the data gathering computing devices, determine that the portable user device has moved to a second location in the customer premises;

based on the second location, adjust the stationary display of the user interface such that the adjustable element is adjusted; and determine at least one of the first location of the portable device and the second location of the portable device by using data from the sensor device relating to a presence of a user and also data from the wireless node indicating a strength of a signal from the wireless node.

2. The system of claim 1, wherein the display-providing computing device is further programmed to display a stream of media content received via a network.

3. The system of claim 1, wherein the display-providing computing device is further programmed to adjust the adjustable element by at least one of re-sizing the adjustable element and changing an audio volume.

4. The system of claim 1, wherein the display-providing computing device is further programmed to determine at least one of the first location of the user device and the second location of the user device in part according to location data provided in the portable user device in addition to the data as well as the additional data received from more than one of the data gathering computing devices.

5. The system of claim 1, wherein the display-providing computing device is further programmed to
determine a third location of a second user device in the customer premises;
determine a priority between the first user device and the second user device; and
adjust the stationary display of the user interface such that the adjustable element is adjusted at least in part based on the priority.

6. A method, comprising:
receive data from a plurality of data gathering devices relating to a location of a portable user device in a customer premises, wherein the plurality of data gathering devices includes at least one of a sensor device and a wireless node;
based on the data received from more than one of the data gathering devices, determining a first location of the portable user device in the customer premises;
receiving additional data relating to a location of the portable user device in the customer premises from more than one of the data gathering devices;
based on the additional data received from more than one of the data gathering devices, determining that the portable user device has moved to a second location in the customer premises;
based on the second location, adjusting the stationary display of the user interface such that the adjustable element is adjusted; and
determining at least one of the first location of the portable device and the second location of the portable device by using data from the sensor device relating to a presence of a user and also data from the wireless node indicating a strength of a signal from the wireless node.

7. The method of claim 6, further comprising displaying a stream of media content received via a network.

8. The method of claim 6, further comprising adjusting the adjustable element by at least one of re-sizing the adjustable element and changing an audio volume.

9. The method of claim 6, further comprising determining at least one of the first location of the user device and the second location of the user device in part according to location data provided in the portable user device in addition to the data as well as the additional data received from more than one of the data gathering devices.

10. The method of claim 6, further comprising:
determining a third location of a second user device in the customer premises;
determining a priority between the first user device and the second user device; and
adjusting the stationary display of the user interface such that the adjustable element is adjusted at least in part based on the priority.

11. A system, comprising:
a plurality of data gathering computing devices programmed to provide data relating to a location of a portable user device in a customer premises; and
a display-providing computing device that includes a processor and a memory, the display-providing computing device programmed to:
receive data relating to a location of the portable user device in the customer premises from more than one of the data gathering computing devices;
based on the data received from more than one of the data gathering computing devices, determine a first location of the portable user device in the customer premises;
provide a display of a user interface that includes an adjustable element;
receive additional data relating to a location of the portable user device in the customer premises from more than one of the data gathering computing devices;
based on the additional data received from more than one of the data gathering computing devices, determine that the portable user device has moved to a second location in the customer premises;
based on the second location, adjust the display of the user interface such that the adjustable element is adjusted;
determine a third location of a second user device in the customer premises;
determine a priority between the first user device and the second user device; and
adjust the stationary display of the user interface such that the adjustable element is adjusted at least in part based on the priority.

12. The system of claim 11, wherein the display-providing computing device is further programmed to display a stream of media content received via a network.

13. The system of claim 11, wherein the display-providing computing device is further programmed to display a stream of media content received via a network.

14. The system of claim 11, wherein the display-providing computing device is further programmed to adjust the adjustable element by at least one of re-sizing the adjustable element and changing an audio volume.

15. The system of claim 11, wherein the display-providing computing device is further programmed to determine at least one of the first location of the user device and the second location of the user device in part according to location data provided in the portable user device in addition to the data as well as the additional data received from more than one of the data gathering computing devices.

16. The system of claim 11, wherein the plurality of data gathering devices includes at least one of a sensor device and a wireless node.

17. The system of claim 11, wherein the display-providing computing device is further programmed to determine at least one of the first location of the portable device and the second location of the portable device by using at least one of data from the sensor device relating to a presence of a user and data from the wireless node indicating a strength of a signal from the wireless node.

* * * * *